United States Patent [19]

Nakada et al.

[11] Patent Number: 4,699,662
[45] Date of Patent: Oct. 13, 1987

[54] BLUE PIGMENTED PHOSPHOR

[75] Inventors: Yoshiyuki Nakada; Masao Asada, both of Yokohama; Kiyoshi Inoue, Tokyo, all of Japan

[73] Assignee: Kabushiki Kaisha Toshiba, Kawasaki, Japan

[21] Appl. No.: 878,679

[22] Filed: Jun. 26, 1986

[30] Foreign Application Priority Data

Jun. 30, 1985 [JP] Japan ................................. 60-143660

[51] Int. Cl.$^4$ ......................... C04B 14/00; C08J 3/00; C08K 3/34
[52] U.S. Cl. ............................... 106/287.13; 106/305; 106/308 Q
[58] Field of Search ............... 106/305, 287.13, 308 Q

[56] References Cited

U.S. PATENT DOCUMENTS

| 4,339,501 | 7/1982 | Inoue et al. | 428/404 |
| 4,440,831 | 4/1984 | Brownlow et al. | 427/64 |
| 4,563,494 | 1/1986 | Ida | 524/398 |
| 4,585,673 | 4/1986 | Sigal | 427/213 |

FOREIGN PATENT DOCUMENTS 52-107769 9/1977 Japan .
60-094491 5/1985 Japan .

Primary Examiner—A. L. Clingman
Attorney, Agent, or Firm—Oblon, Fisher, Spivak, McClelland & Maier

[57] ABSTRACT

In ultramarine blue, or a blue pigmented phosphor in which ultramarine blue is a constituent, a coating of organic silicon compound is formed on the surface of the ultramarine blue pigment. This coating prevents fading of the ultramarine blue during the manufacture of cathode ray tubes.

7 Claims, 9 Drawing Figures

BLUE PIGMENTED PHOSPHOR

BACKGROUND OF THE INVENTION

This invention relates to blue pigmented phosphors for color cathode ray tubes.

In recent years so-called pigmented phosphors in which a pigment which reflects the emission color of the phosphor and absorbs other visible light is bonded to the surface of the phosphor have been used to improve screen contrast in cathode ray tubes used for color televisions.

The pigments used at present are cobalt aluminate and ultramarine blue for blue, and iron oxide, cadmium sulphoselenide and indium sulphide for red, and in all cases they are controlled to an average grain diameter of 0.05 μm–5 μm and bonded to a phosphor of 0.1 to 21 μm. Apart from being matched to the emission spectrum of the phosphor, the pigments used in the phosphors for these cathode ray tubes also have excellent emission characteristics. It can be assumed that the better the tinting strength of the pigment the better the pigment. However, in practice the pigments chiefly used in color cathode ray tubes are cobalt blue for blue and iron oxide for red. Ultramarine blue and cadmium sulphoselenide are pigments with better spectral reflection characteristics than these but are not used at present. The reason for this, apart from the fact that there is a problem of pollution with cadmium sulphoselenide, is the fact that pigments such as ultramarine blue fade during the manufacturing process of the color cathode ray tube.

There are two kinds of fading, namely the oxidation fading which occurs when the sodium polysulphide in ultramarine blue is oxidized by the oxygen in the air and by the heat in the color cathode ray tube manufacturing process (hereinafter referred to as air oxidation), and oxidation fading caused by chromates such as ammonium dichromate and sodium dichromate which are used as sensitizers when the phosphor membrane is formed (hereinafter referred to as chromate oxidation).

Air oxidation occurs particularly during the cathode ray tube manufacturing process. This is partly due to the fact that the temperature is raised to about 420° C. when the section which forms the screen to which the phosphor is applied (face) is sealed to the anode and electron gun section (funnel and neck) using frit glass as the sealant. It is also partly due to the fact that the temperature is raised to close to 450° C. to achieve thermal decomposition of the polyvinyl alcohol used when the phosphor membrane is formed and of the organic films used to level the aluminium membrane after formation of the phosphor membrane. The limit of stability of ultramarine blue itself is 300° C. and if it is heated above this temperature the ultramarine blue is oxidized in accordance with the following equation:

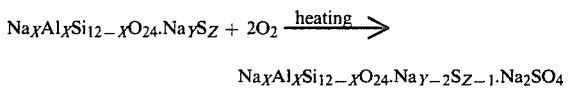

$$Na_xAl_xSi_{12-x}O_{24}.Na_yS_z + 2O_2 \xrightarrow{heating}$$

$$Na_xAl_xSi_{12-x}O_{24}.Na_{y-2}S_{z-1}.Na_2SO_4$$

In other words, when the temperature exceeds 300 C. the sodium polysulphide in the ultramarine blue is oxidized by the oxygen in the air to sodium sulphate, the characteristic blue coloration of ultramarine blue disappears and fades to white.

The chromates (sodium dichromate and ammonium dichromate) which are used as sensitizers during the formation of the phosphor membrane are the cause of the chromate oxidation. These chromates have a powerful oxidizing action, as is evident from the fact that they are generally used as anti-reduction powders and as oxidizing agents for metals.

When the phosphor membrane is formed a slurry is prepared by blending together the phosphor, polyvinyl alcohol, dichromates and dispersing agent in the form of polyhydric alcohol. This is applied to the inner surface of the face which will form the screen of the cathode ray tube, and dots or stripes of the phosphor are formed by drying, exposure and development. During the exposure the polyvinyl alcohol promotes photopolymerization by the light absorbed by the chromate, and the chromium changes from $Cr^{+6}$ to $Cr^{+3}$ and loses its oxidizing power. In other words, it forms a compound which does not influence the fading of ultramarine blue, but the presence of unreacted 6-valent chromium remains a problem with respect to fading of ultramarine blue. This unreacted 6-valent chromium is removed to some extent by showering in the subsequent development process but the 6-valent chromium which has not been removed by these processes fades the ultramarine blue from blue to white in the baking process of the cathode ray tube process according to the following equation:

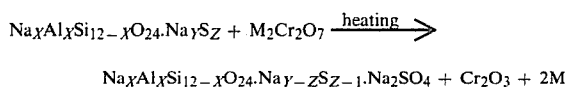

$$Na_xAl_xSi_{12-x}O_{24}.Na_yS_z + M_2Cr_2O_7 \xrightarrow{heating}$$

$$Na_xAl_xSi_{12-x}O_{24}.Na_{y-z}S_{z-1}.Na_2SO_4 + Cr_2O_3 + 2M$$

This case is similar to the fading of the ultramarine blue due to air oxidation, in that the sodium polysulphides in the ultramarine blue fade forming sodium sulphate by oxidation. This is because the 6-valent chromic oxide, which is powerful oxidizing agent, releases oxygen at a temperature of 275° C. with the formation of 3-valent chromium, and this oxygen oxidizes the sodium polysulphide to sodium sulphate. This extent of fading due to chromate oxidation of the ultramarine blue is even more severe with air oxidation. However, neither of them can be disregarded when pigmented phosphors are used and for this reason it has until now been extremely difficult to use ultramarine blue as the blue pigment. Japanese Patent Disclosure No. 60-94491 has a method for improving this type of ultramarine blue fading. This is a method where the surface of the pigment is coated with a silicon compound and, as shown in the embodiment, the coating is an inorganic silicon compound.

There is also another method shown in Japanese Patent Publication No. 59-10709 in which the surfaces of the pigment and the phosphor are covered with a continuous film of silica. However, the film obtained in this method is made of inorganic material. If the above methods are used the fading of ultramarine blue in the baking process of the color cathode ray tube can be prevented to a certain extent, but it is not sufficient and, especially with the slurry method which uses dichromate, there is considerable fading.

SUMMARY OF THE INVENTION

An object of this invention is to solve the problems of the type mentioned above, and to prevent the oxidation fading of ultramarine blue by forming a film of organic silicon compound on the surface of the ultramarine blue and to make use of this to offer an outstanding blue pigmented phosphor for color cathode ray tubes.

The distinctive feature of the blue pigmented phosphor of this invention is therefore that in the blue pigmented phosphor in which the pigment is ultramarine blue or a mixture of ultramarine blue and cobalt aluminate a coating of organic silicon compound is formed on the surface of the ultramarine blue. This coating is composed of an organic silicon compound obtained by hydrolysing at least one of the materials selected from the group consisting of methyl silicate, ethyl silicate, vinyltrichlorosilane, vinyltriethoxy silane, vinyltris-(beta-methoxyethoxy)silane, gamma-glycidoxypropyl trimethoxysilane, gamma-metaacryloxypropyltrimethoxysilane, N-beta-(aminoethyl)gamma-aminopropyltrimethoxysilane, N-beta-(aminoethly)gamma-amino-propylmethyl dimethoxysilane, gamma-chloropropyltrimethoxysilane, gamma-mercaptopropyltrimethoxysilane, gamma-aminopropyltriethoxysilane. The blue pigment phosphor is manufactured by forming a film of organic silicon compound on the surface of ultramarine blue by bringing the compounds, before hydrolysis, into contact with ultramarine blue, or a mixture of ultramarine blue and cobalt aluminate, and then mixing the phosphor and the pigment containing the ultramarine blue coated with organic silicon compound.

The film of organic silicon compound according to the invention forms silanol radicals by advance hydrolysis of easily-hydrolysed radicals which are linked to silicon as expressed by the following equation.

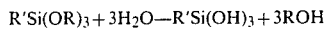

$$R'Si(OR)_3 + 3H_2O \rightarrow R'Si(OH)_3 + 3ROH$$

These form strong covalent bonds by initiating a condensation reaction with the silica and alumina of the pigment surface as shown in FIG. 1. The ultramarine blue or pigment obtained by this method is able to retain the characteristic blue color of ultramarine blue without fading, even in the cathode ray tube manufacturing process.

A continuous film is formed in which the hydrocarbon radicals containing the functional groups are interposed between the silicon.

This forms a finer membrane than a coating of inorganic silica and it is considered that this is why it is able to suppress the adsorption of chromium ions in the slurry in which pigmented phosphor and dichromate sensitizer are suspended. In practice it is advisable to select an amount of coating of organic silicon compound to provide a minimum of 10% by weight with respect to the ultramarine blue for an average grain diameter of the ultramarine blue of 2.0–3.0 μm, to exceed the minimum of 10% by weight for an average grain diameter of the ultramarine blue of less than 2.0 μm and to provide a minimum of 5% by weight for an average grain diameter of the ultramarine blue of more than 3.0 μm.

DETAILED DESCRIPTION OF THE PREFERRED EMBODIMENTS

This invention is described below by means of the embodiments.

EMBODIMENT 1

Ultramarine blue with an average grain diameter of 0.9 μm was weighed out into separate lots of 100 g, transferred to a 2,000 ml beaker, 1,000 ml of deionized water were added and allowed to disperse for 20 minutes. 200% by weight with respect to the ultramarine blue of N-beta(aminoethyl)gamma-aminopropyl trimethoxysilane was then added gradually to the beaker and stirred for 1 hour. This produced an organic silicon compound containing the N-beta(aminoethyl)-gamma-aminopropyl radical which was coated on the pigment surface. For the sake of comparison mixtures were prepared in which 50% by weight with respect to the ultramarine blue of the organic silicon compound had been added and stirred, and 100% by weight of the organic silicon compound had been added and stirred.

The resulting film of organic silicon compound formed on the pigment was rinsed 5 times by decantation. It was then placed in a 1,000 ml beaker and the total volume was made up to 500 ml by adding deionized water. Glass beads of 1.5 mm diameter were then added and the mixture was milled for 2 hours and passed through a 400 mesh stainless steel sieve. This solution constituted the pigment dispersant.

The oxidation fading of the pigment alone was tested using this pigment dispersant which had been filtered and dried naturally. The method for testing the oxidation fading is as follows. 10 ml of 10% dichromate (ammonium salt or sodium salt) was added in small quantities of 50 g pigment in which a film of organic silicon compound has been formed on the ultramarine blue and they were mixted together by kneading. After this had been dried by steam drying at 70° C. it was placed in a 200 ml beaker, 100 ml deionized water was added and the slurry was stirred while the pigment dispersed. It is then allowed to stand, the supernatant liquid was removed and, after the dichromate had been removed by adding 100 ml of deionized water, stirring and decanting and repeating for a total of 5 times, it was filtered and dried. It was then transferred to a glass plate made of heat resisting glass and baked at 450° C. for 1 hour in an oxidizing atmosphere, and the spectral reflectance curve was measured. The results are shown in FIG. 2.

Figure 6:
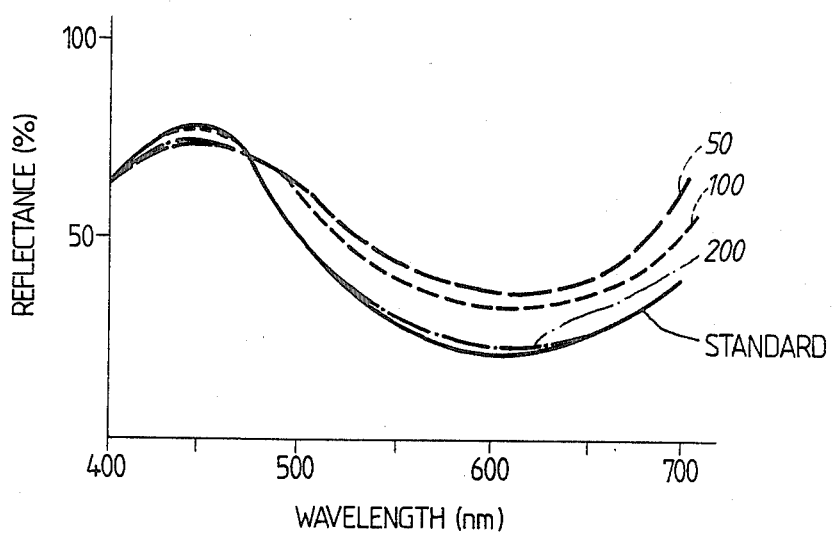
FIG. 6 to FIG. 9 show the reflectance curves of the blue pigmented phosphor in relation to the quantity of the film of organic silicon compound for the cases when the average grain diameters of the ultramarine blue are, respectively, less than 1.0 μm, 1.0–2.0 μm, 2.0–3.0 μm, and more than 3.0 μm.

Separately, after 100 g ZnS/Ag blue emission phosphor, selected with a suitable grain diameter of 2–15 μm, had been dispersed in 1,000 ml deionized water, the ultramarine blue, in the form of 10 g of the previously prepared pigment dispersant, was added and stirred again for 30 minutes. 40 ml of 0.01% by weight solution of polyacrylicamide was added gradually with stirring which was then continued for 1 hour. After the resulting pigmented phosphor had been rinsed by decantation it was filtered and, after drying again by steam drying, was passed through a 400 mesh stainless steel sieve. The phosphor obtained in this way was ZnS/Ag blue phosphor with ultramarine blue. To 100 g of this pigmented phosphor were added deionized water, polyvinyl alcohol, dichromate and polyhydric alcohol and the slurry was mixed. A 4 cm×4 cm quartz glass plate was fixed to the centre of the face plate of cathode ray tube and the phosphor was applied to the quartz glass plate. This was again dried using the drying, exposing and developing process and baked for 1 hour at 450° C. in an oxidizing atmosphere. The reflectance was measured and the results are shown in FIG. 6.

The Beckman DK model 2A reflectance measuring equipment (trade name: Beckman Spectrophotomer) was used for the measurement of the reflectance curve, and corrections were made taking the reflectance of the Eastman Kodak white standard powder type No. 6091 as 99.2% at 700 nm, 99.1% at 500 nm, and 98.7% at 400 mn.

Figure 1:
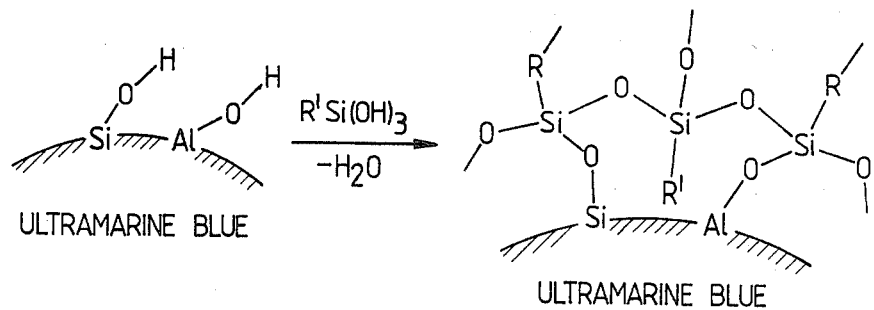
FIG. 1 shows a typical situation when the film of organic silicon compound is formed on the surface of the ultramarine blue.
Figure 2:
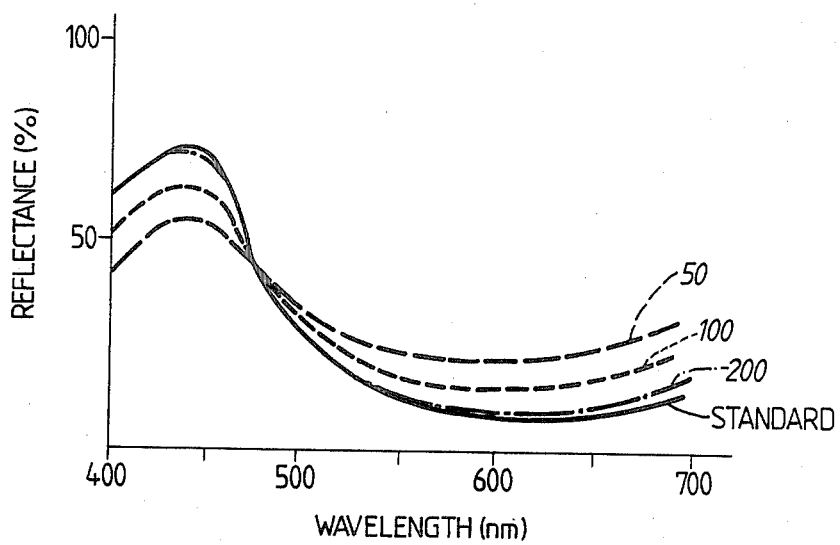
FIG. 2 to FIG. 5 show the reflectance curves of ultramarine blue in relation to the quantity of the film of organic silicon compound for the cases when the average grain diameters of the ultramarine blue are, respectively, less than 1.0 μm, 1.0–2.0 μm, 2.0–3.0 μm, and more than 3.0 μm.

The solid line shown in FIG. 2 is the spectral reflection curve, before baking, of the pigment with which this invention is concerned and is taken as the standard for comparison. The solid line shown in FIG. 6 is also a standard for comparison, being the spectral reflectance curve, before baking, of the blue pigmented phosphor coated with the pigment shown by the solid line in FIG. 2. As can be seen from FIG. 2 and FIG. 6 the fading of the ultramarine blue varies according to the amount of coating of organic silicon compound; the larger this amount the less fading there is. When the average ultramarine blue grain diameter is 0.9 $\mu$m there is very little oxidation fading of the ultramarine blue with a coating of organic silicon compound of 200% by weight.

Based on other detailed experimental results in which the pigment grain diameter and the amount of organic silicon compound coating were varied in small steps it was confirmed that for an average ultramarine blue grain diameter of not more than 1.0 $\mu$m and an organic silicon compound coating of at least 200% by weight with respect to the ultramarine blue the oxidation fading of the ultramarine blue virtually disappears.

EMBODIMENT 2

Figure 3:
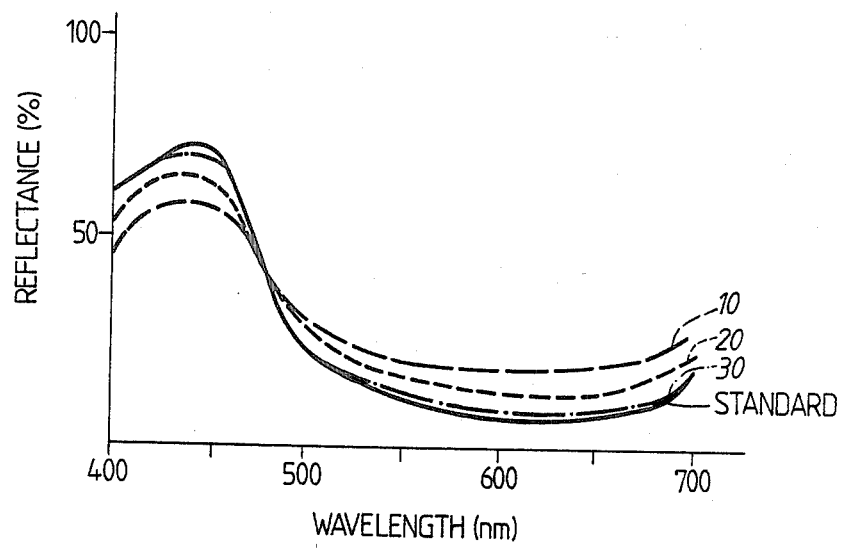

Taking ultramarine blue of an average grain diameter of 1.5 $\mu$m and following the same method used for embodiment 1 a pigment and a pigmented phosphor were obtained which had coatings of 30% by weight with respect to the ultramarine blue of an organic silicon compound containing the N-beta(aminoethyl)gamma-aminopropyl radical. The same general plan used in embodiment 1 was followed for the pigment and pigmented phosphor respectively, and the spectral reflectance curves after the dichromate treatment and baking treatment are shown in FIG. 3 (pigment) and FIG. 7 (pigmented phosphor). The solid line shown in FIG. 3 is the spectral reflection curve, before baking, of the pigment with which this invention is concerned and is taken as the standard for comparison. The solid line shown in FIG. 7 is also a standard for comparison, being the spectral reflectance curve, before baking, of the blue pigmented phosphor coated with the pigment shown by the solid line in FIG. 3.

Figure 7:
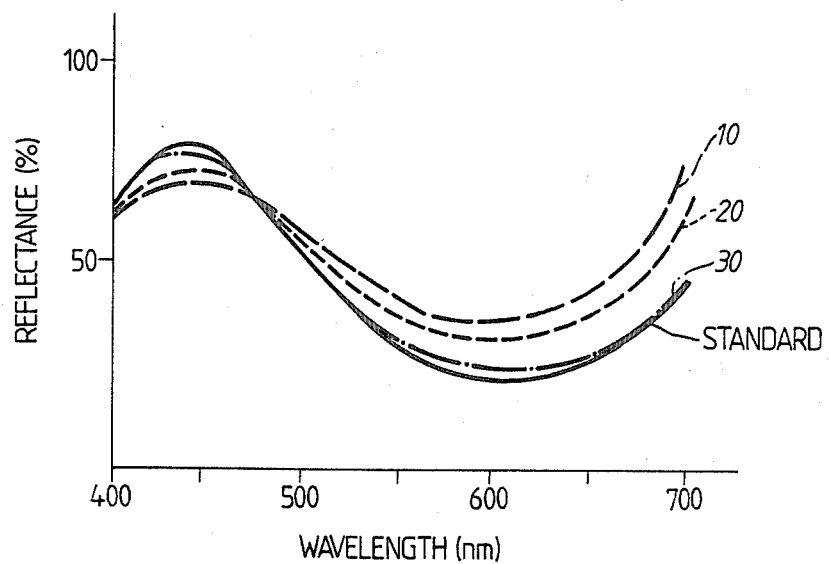

As can be seen from FIG. 3 and FIG. 7 the fading of the ultramarine blue varies according to the amount of coating of organic silicon compound; the larger this amount the less fading there is. When the average ultramarine blue grain diameter is 1.5 $\mu$m there is very little oxidation fading of the ultramarine blue with a coating of organic silicon compound of 30% by weight.

Based on other detailed experimental results in which the pigment grain diameter and the amount of organic silicon compound coating were varied in small steps it was confirmed that for an average ultramarine blue grain diameter of 1.0-2.0 $\mu$m and an organic silicon compound coating of at least 30% by weight with respect to the ultramarine blue the oxidation fading of the ultramarine blue virtually disappears.

EMBODIMENT 3

Taking ultramarine blue of an average diameter of 2.5 $\mu$m and following the same method used for embodiment 1 a pigment and a pigmented phosphor were obtained which had a coating of 10% by weight with respect to the ultramarine blue of an organic silicon compound containing the N-beta(aminoethyl)gamma-aminopropyl radical obtained by hydrolysing N-beta(aminoethyl)gamma-aminopropyl trimethoxysilane. For comparison pigments and pigmented phosphors were also prepared with coatings of 2% by weight and 5% by weight with respect to the ultramarine blue of the organic silicon compound containing the N-beta(aminoethyl)gamma-aminopropyl radical.

Figure 4:
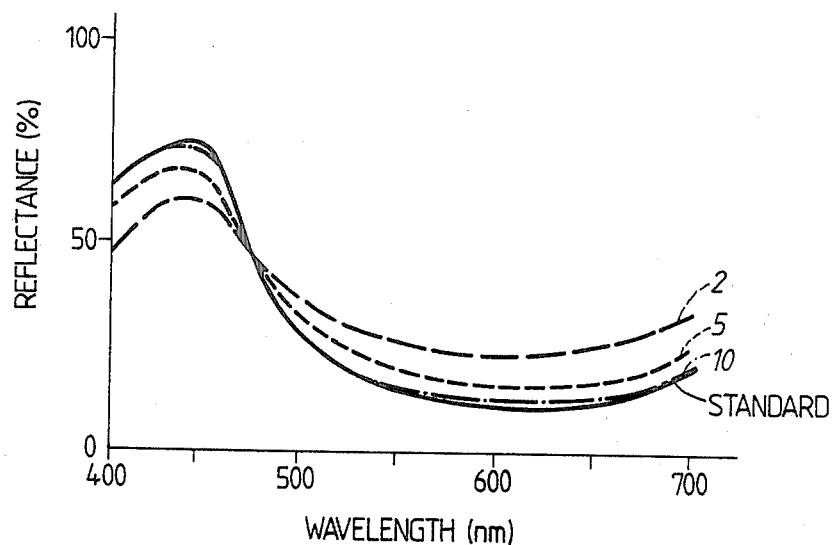
Figure 8:
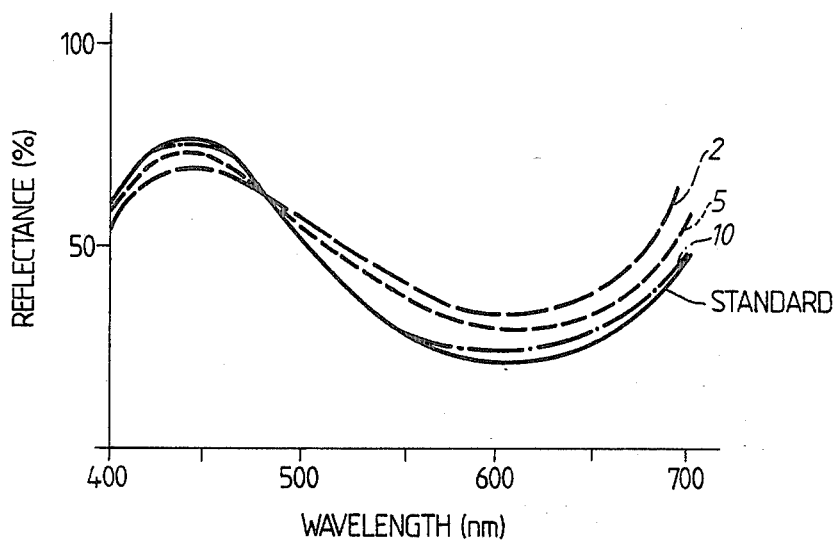

The same general plan used in embodiment 1 was followed for the pigment and pigmented phosphor respectively and the spectral reflectance curves after the dichromate treatment and baking treatment are shown in FIG. FIG. 4 (pigment) and FIG. 8 (pigmented phosphor). The solid line shown in FIG. 4 is the spectral reflection curve, before baking, of the pigment with which this invention is concerned and is taken as the standard for comparison. The solid line shown in FIG. 8 is also a standard for comparison, being the spectral reflectance curve, before baking, of the blue pigmented phosphor coated with the pigment shown by the solid line FIG. 4.

As can be seen from FIG. 4 and FIG. 8 the fading of the ultramarine blue varies according to the amount of coating of organic silicon compound; the larger this amount the less fading there is. When the average ultramarine blue grain diameter is 2.5 $\mu$m there is very little oxidation fading of the ultramarine blue with a coating of organic silicon compound of 10% by weight.

Based on other detailed experimental results in which the pigment grain diameter and the amount of organic silicon compound coating were varied in small steps it was confirmed that for an average ultramarine blue grain diameter of 2.0-3.0 $\mu$m and an organic silicon compound coating of at least 10% by weight with respect to the ultramarine blue the oxidation fading of the ultramarine blue virtually disappears.

EMBODIMENT 4

Figure 5:
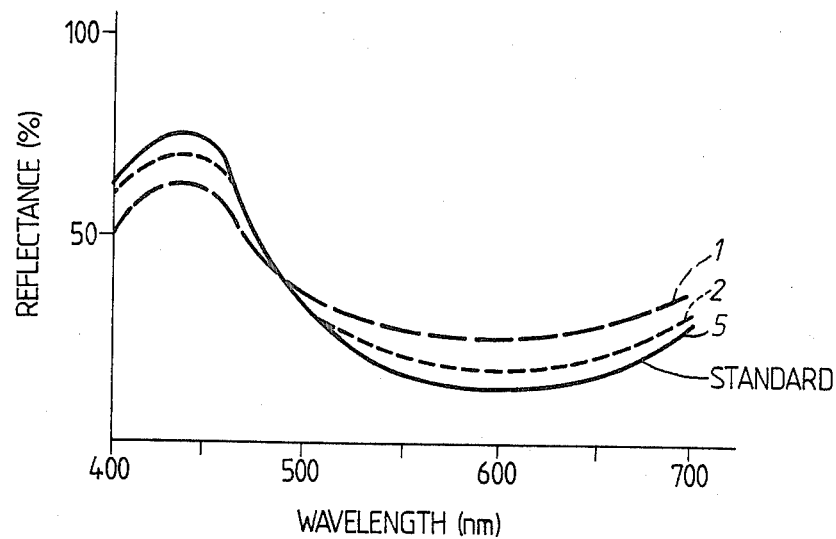

Taking ultramarine blue of an average grain diameter of 3.5 $\mu$m and following the same method used for embodiment 1 a pigment and a pigmented phosphor were obtained which had coatings of 5% by weight with respect to the ultramarine blue of an organic silicon compound containing the N-beta(aminoethyl)gamma-aminopropyl radical. For comparison pigments and pigmented phosphors were also prepared with coatings of 1% by weight and 2% by weight with respect to the ultramarine blue of the organic silicon compound containing the N-beta(aminoethyl)gamma-aminopropyl radical. The same general plan used in embodiment 1 was followed for the pigment and pigmented phosphor respectively, and the spectral reflectance curves after the dichromate treatment and baking treatment are shown in FIG. 5 (pigment) and FIG. 9 (pigmented phosphor). The solid line shown in FIG. 5 is the spectral reflection curve, before baking, of the pigment with which this invention is concerned and is taken as the standard for comparison. The solid line shown in FIG. 9 is also a standard for comparison, being the spectral reflectance curve, before baking, of the blue pigmented phosphor coated with the pigment shown by the solid line FIG. 5

Figure 9:
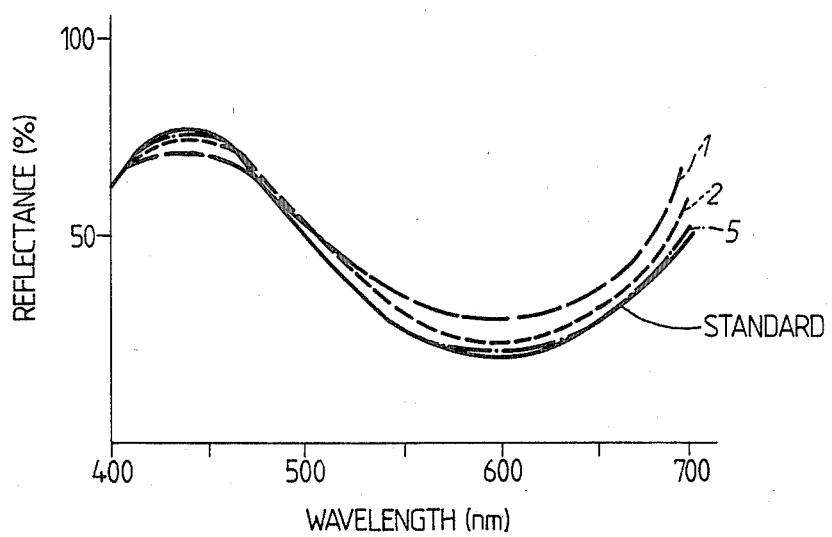

As can be seen from FIG. 5 and FIG. 9 the fading of the ultramarine blue varies according to the amount of coating of organic silicon compound; the larger this amount the less fading there is. When the average ultramarine blue grain diameter is 3.5 μm there is very little oxidation fading of the ultramarine blue with a coating of organic silicon compound of 5% by weight.

Based on other detailed experimental results in which the pigment grain diameter and the amount of organic silicon compound coating were varied in small steps it was confirmed that for an average ultramarine blue grain diameter of more than 3 μm and an organic silicon coating of at least 5% by weight with respect to the ultramarine blue the oxidation fading of the ultramarine blue virtually disappears.

As can be seen from the above embodiments 1-4, the extent of the oxidation fading varies according to the average grain diameter of the ultramarine blue and if the amount of organic silicon compound is kept constant the smaller the average grain diameter the more severe the fading. This is because of the increased effect of the heat in relation to the surface area of the pigment. Consequently, the smaller the average grain diameter of the ultramarine blue the greater is the amount of silicon compound required to prevent oxidation fading of the ultramarine blue.

EMBODIMENTS 5-11

Taking ultramarine blue of an average grain diameter of 2.5 μm pigmented phosphors were prepared with coatings of 10% by weight with respect to the ultramarine blue of organic silicon compounds obtained by the hydrolysis of, respectively, N-beta(aminoethyl)gamma-aminoproplytrimethoxysilane, methylsilicate, ethylsilicate, vinyltris(beta-methoxyethoxy)silane, gamma-glycidoxypropyltrimethoxysilane, N-beta(aminoethyl)-gamma-aminopropylmethylethoxysilane, and gamma-aminopropyltriethoxysilane. The same general plan used for embodiment 1 was followed for the pigment and pigmented phosphor respectively, and the spectral reflectance characteristics at wave lengths of 450 nm and 600 nm before and after the dichromate and baking procedures are shown in Table 1.

Embodiments 5-11 show that if the average grain diameter of the ultramarine blue is constant the amount of organic silicon compound required to form a coating of organic silicon compound on the pigment is approximately the same regardless of the type of organic silicon compound used. Ultimately this is due to the fact that the amounts of organic silicon compound which can be coated on the pigment surface are similar. In contrast to the phosphors with coatings of organic silicon compound represented by embodiments 1-11, there is severe oxidation fading with phosphors with coatings of amorphous silica (inorganic silicon compounds) of which A and B are examples shown for comparison in Table 1. Comparison sample C shows a case where the coating has been formed using the small amount of 5% by weight of organic silicon compound, made by hydrolysing N-beta(aminoethyl)gamma-aminopropyltrimethoxysilane, and the effectiveness is also reduced if there is to little of the compound. In practice, the amount of the coating of organic silicon compound required for average ultramarine blue grain diameters of less then 1.0 μm, 1.0 μm to less than 2.0 μm, 2.0–3.0 μm and more than 3.0 μm are respectively at least 200% by weight, at least 30% by weight, at least 10% by weight and at least 5% by weight with respect to the ultramarine.

The amount of bonded pigment is 0.1–15% by weight with respect to the phosphor, and the amount of ultramarine blue in the pigment is ideally 0.05–15% by weight with respect to the phosphor.

Because the ultramarine blue, or blue pigmented phosphor in which ultramarine blue is a constituent, according to this invention as described above, prevents oxidation fading it is particularly outstanding as a blue pigmented phosphor for used in color cathode ray tubes. This invention does still of course apply even if this pigment is mixed with other similar pigments such as cobalt aluminate.

TABLE 1

| embodiment no. | silicon compound (original raw material) | coating of silicon compound | reflectance at 600 nm before baking | reflectance at 600 nm after baking | reflectance at 450 nm before baking | reflectance at 450 nm after baking |
| --- | --- | --- | --- | --- | --- | --- |
| 5 | N—(aminoethyl)-aminopropyltrimethoxysilane | 10 wt % | 22.2 | 22.4 | 79.8 | 79.5 |
| 6 | methylsilicate | 10 wt % | 22.2 | 22.5 | 79.8 | 79.4 |
| 7 | ethylsilicate | 10 wt % | 22.1 | 22.3 | 79.5 | 79.7 |
| 8 | vinyltris(-methoxyethoxy)silane | 10 wt % | 22.3 | 22.3 | 79.5 | 79.5 |
| 9 | -glycidoxypropyltrimethoxysilane | 10 wt % | 22.1 | 22.2 | 79.7 | 79.5 |
| 10 | N—(aminoethyl) aminopropylmethyl ethoxysilane | 10 wt % | 22.2 | 22.5 | 79.2 | 79.8 |
| 11 | -aminopropyltriethoxysilane | 10 wt % | 22.0 | 22.3 | 79.6 | 79.5 |
| A | amorphous silica | 10 wt % | 22.5 | 27.4 | 80.5 | 75.2 |
| B | amorphous silica | 10 wt % | 22.1 | 31.1 | 79.2 | 73.8 |
| C | N—(aminoethyl)-aminopropyl trimethoxysilane | 5 wt % | 22.1 | 27.8 | 79.6 | 74.1 |

We claim:

1. A blue pigmented phosphor comprising a blue-emitting phosphor and a pigment containing ultramarine blue bonded to said phosphor, and a coating of an organic solution compound formed on a surface of said pigment, wherein said organic silicon compound is obtained by hydrolyzing at least one compound selected from the group consisting of methylsilicate, ethylsilicate, vinyltrichlorosilane, vinyltriethoxysilane, vinyltris(beta-methoxyethoxy)silane, gamma-glycidoxypropyl trimethoxysilane, gamma-meta-acryloxypropyl trimethoxysilane, N-beta-(aminoethyl)gamma-aminopropyltrimethoxysilane, N-beta-(aminoethyl)gamma-aminopropyltrimethoxysilane, N-beta-(aminoethyl)-gamma-aminopropylmethyldimethoxysilane, gamma-chloropropyltrimethoxysilane, gamma-mercaptopropyltrimethoxysilane, and gamma-aminopropyltriethoxysilane; and wherein said blue-emitting phosphor is a zinc sulfide phosphor having an average grain diameter of 2–15 μm which has an activator selected from the group consisting of silver, silver and chlorine, and silver and aluminum.

2. The blue pigmented phosphor according to claim 1, in which said pigment consists essentially of ultramarine blue.

3. The blue pigmented phosphor according to claim 1, in which said pigment is a mixture of ultramarine blue and cobalt aluminate.

4. The blue pigmented phosphor according to claim 1, in which the amount of organic compound coating is minimum of 10% by weight with respect to the ultramarine blue for an average grain diameter of the ultramarine blue of 2.0–3.0 μm, exceeds a minimum of 10% by weight for an average grain diameter of the ultramarine blue of less than 2.0 μm and is a minimum of 5% by weight for an average grain diameter of the ultramarine blue of more than 3.0 μm.

5. The blue pigmented phosphor according to claim 4 which the amount of bonded phosphor is 0.1–15% by weight with respect to the phosphor, and the amount of ultramarine blue in the pigment is 0.05–15% by weight with respect to the phosphor.

6. The blue pigmented phosphor according to claim 1, wherein said organic silicon compound is obtained by hydrolyzing N-beta-(aminoethyl)gamma-aminopropyl trimethoxysilane.

7. The blue pigmented phosphor according to claim 4, wherein said ultramarine blue has an average grain diameter in the range of 2.0 to 3.0 μm.

* * * * *